United States Patent
Sakabe et al.

(10) Patent No.: US 12,139,622 B2
(45) Date of Patent: Nov. 12, 2024

(54) HOLLOW RESIN PARTICLES FOR THERMOSENSITIVE RECORDING MEDIA

(71) Applicant: MATSUMOTO YUSHI-SEIYAKU CO., LTD., Yao (JP)

(72) Inventors: Koichi Sakabe, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 597 days.

(21) Appl. No.: 17/437,923

(22) PCT Filed: Mar. 17, 2020

(86) PCT No.: PCT/JP2020/011586
§ 371 (c)(1),
(2) Date: Sep. 10, 2021

(87) PCT Pub. No.: WO2020/189653
PCT Pub. Date: Sep. 24, 2020

(65) Prior Publication Data
US 2022/0127478 A1    Apr. 28, 2022

(30) Foreign Application Priority Data
Mar. 20, 2019 (JP) .................. 2019-053535

(51) Int. Cl.
*C09D 11/107* (2014.01)
*B41M 5/42* (2006.01)
(Continued)

(52) U.S. Cl.
CPC ........... *C09D 11/107* (2013.01); *B41M 5/423* (2013.01); *B41M 5/44* (2013.01); *C08J 9/141* (2013.01);
(Continued)

(58) Field of Classification Search
CPC ....... C09D 11/107; B41M 5/423; B41M 5/44; C08J 9/141; C08J 9/20; C08J 9/232; C08J 2203/22; C08J 2333/20
(Continued)

(56) References Cited

U.S. PATENT DOCUMENTS

2005/0137088 A1    6/2005  Hayakawa et al.
2007/0154711 A1    7/2007  Masuda et al.
(Continued)

FOREIGN PATENT DOCUMENTS

CN    101351265 A    1/2009
CN    101824230 A    9/2010
(Continued)

OTHER PUBLICATIONS

Communication dated Jun. 2, 2022, issued in corresponding Chinese Application No. 202080022829.5.
(Continued)

*Primary Examiner* — Michael M. Bernshteyn
(74) *Attorney, Agent, or Firm* — Sughrue Mion, PLLC (57) ABSTRACT

Hollow resin particles for thermosensitive recording media containing a thermoplastic resin shell and a hollow part surrounded by the shell. The hollow resin particles contain a thermally-vaporizable hydrocarbon in an encapsulation ratio of at least 0.2 wt %. The hollow resin particles preferably have a mean volume particle size ranging from 0.1 to 10 μm.

9 Claims, 3 Drawing Sheets

(51) Int. Cl.
*B41M 5/44* (2006.01)
*C08J 9/14* (2006.01)
*C08J 9/20* (2006.01)
*C08J 9/232* (2006.01)

(52) U.S. Cl.
CPC .............. *C08J 9/20* (2013.01); *C08J 9/232* (2013.01); *C08J 2203/22* (2013.01); *C08J 2333/20* (2013.01)

(58) Field of Classification Search
USPC .......................................................... 521/56
See application file for complete search history.

(56) References Cited

U.S. PATENT DOCUMENTS

| | | | |
|---|---|---|---|
| 2012/0080131 A1 | 4/2012 | Teratani et al. | |
| 2013/0053240 A1 | 2/2013 | Takahama et al. | |
| 2016/0310924 A1* | 10/2016 | Nakatomi | B01J 13/18 |
| 2019/0194415 A1 | 6/2019 | Tayagaki et al. | |

FOREIGN PATENT DOCUMENTS

| | | | | |
|---|---|---|---|---|
| CN | 102917883 A | | 2/2013 | |
| CN | 105722868 A | | 6/2016 | |
| CN | 109476772 A | | 3/2019 | |
| EP | 2 554 392 A1 | | 2/2013 | |
| EP | 2 993 055 A1 | | 3/2016 | |
| JP | 06-340174 A | | 12/1994 | |
| JP | 2003341236 A | * | 12/2003 | |
| JP | 2004-202770 A | | 7/2004 | |
| JP | 2005074984 A | * | 3/2005 | |
| JP | 2006-76112 A | | 3/2006 | |
| JP | 2008062527 A | * | 3/2008 | |
| JP | 2008062537 A | * | 3/2008 | |
| JP | 2008-221728 A | | 9/2008 | |
| JP | 2008-229930 A | | 10/2008 | |
| JP | 2009-279943 A | | 12/2009 | |
| JP | 2011-224817 A | | 11/2011 | |
| JP | 2012224056 A | * | 11/2012 | |
| WO | WO-2005049698 A1 | * | 6/2005 | .............. B01J 13/04 |

OTHER PUBLICATIONS

International Search Report for PCT/JP2020/011586 dated Jun. 9, 2020 (PCT/ISA/210).

Office Action issued Aug. 12, 2024 by Korean Intellectual Property Office in Korean Application No. 10-2021-7032231.

* cited by examiner

HOLLOW RESIN PARTICLES FOR THERMOSENSITIVE RECORDING MEDIA

CROSS-REFERENCE TO RELATED APPLICATIONS

This application is a National Stage of International Application No. PCT/JP2020/011586 filed Mar. 17, 2020, which claims priority from Japanese Patent Application No. 2019-053535 filed Mar. 20, 2019.

BACKGROUND OF THE INVENTION

1. Field of the Invention

The present invention relates to hollow resin particles for thermosensitive recording media and application thereof.

2. Description of the Related Art

Various recording media have been practically used in the field of information recording. Of those recording media, thermosensitive recording media are used in various fields including information processing, recorders for medical instruments, facsimile, automatic ticket vending machines, thermal copying machines, label printing in POS systems, and baggage tag printing, owing to their advantages of: 1) easy recording of images by heat processing alone, 2) providing simple and compact recording devices and inexpensive and easy-to-handle recording media, and 3) requiring only one material (thermosensitive paper) in use.

Thermosensitive recording media necessarily have high thermal responsiveness (sensitivity) and achieve sufficient color optical density (precision) of recorded images. For realizing these properties, PTL 1 proposes a thermosensitive recording medium containing hollow particles having a hollow ratio of at least 70%, and PTL 2 proposes a thermosensitive recording medium containing hollow styrene-acrylic resin particles having a hollow ratio of at least 50%.

Some processes of manufacturing thermosensitive recording media contain a step of pressurizing the recording surface of the thermosensitive recording media by a super calendar for the purpose of smoothing the surface.

[PTL 1] Japanese Patent Application Publication No. 2009-279943

[PTL 2] Japanese Patent Application Publication No. 1994-340174

3. Problems to be Solved by the Invention

The hollow particles in PTL 1, however, were found to deform as the result of shrinking or denting due to extremely high pressure applied by super-calendar processing, resulting in insufficient sensitivity and precision of the resultant thermosensitive recording media. In addition, the hollow styrene-acrylic resin particles in PTL 2 were found to have an insufficient thermal insulation property due to their low hollow ratio resulting in low sensitivity of the resultant thermosensitive recording media.

SUMMARY OF THE INVENTION

It is therefore an objection of the present invention to provide hollow resin particles for thermosensitive recording media that enable the manufacture of thermosensitive recording media having high sensitivity and that can achieve high precision.

After diligent study for solving the above problems, the present inventors found that hollow resin particles having a specific performance can contribute to the manufacture of thermosensitive recording media having high sensitivity and which can achieve high precision, to thereby achieve the present invention.

More particularly, the above object has been achieved by providing (1) hollow resin particles for thermosensitive recording media comprising a thermoplastic resin shell and a hollow part surrounded by the shell, wherein the hollow resin particles contain a thermally-vaporizable hydrocarbon in an encapsulation ratio of at least 0.2 wt %.

In a preferred embodiment (2), the hollow resin particles for thermosensitive recording media (1) have a mean volume particle size ranging from 0.1 to 10 µm.

In another preferred embodiment (3), the thermoplastic resin constituting the shell of the hollow resin particles for thermosensitive recording media (1) or (2) above is a polymer of a polymerizable component containing at least 80 wt % of a nitrile monomer.

In yet another preferred embodiment (4) of the hollow resin particles for thermosensitive recording media (1) to (3) above, the thermally-vaporizable hydrocarbon contains a hydrocarbon (A) having a boiling point of 60° C. or lower.

In yet another preferred embodiment (5) of the hollow resin particles for thermosensitive recording media (1) to (4) above, the hollow resin particles have a hollow ratio ranging from 71 to 95%.

Advantageous Effects of Invention

The hollow resin particles for thermosensitive recording media of the present invention enable the manufacture of thermosensitive recording media having high sensitivity and achieving high precision.

The thermosensitive recording media containing the hollow resin particles for thermosensitive recording media of the present invention have high sensitivity and can achieve high precision.

REFERENCE NUMERAL LIST

Reference numerals used to identify various features in the drawings include the following.
1. Shell
2. Hollow part 3. Substrate
4. Under layer
5. Thermosensitive recording layer
6. Protective layer
7. Adhesive layer

DETAILED DESCRIPTION OF THE PREFERRED EMBODIMENTS

The present invention will now be described in greater detail with reference to the drawings. However, the present invention should not be construed as being limited thereto.

The hollow resin particles for thermosensitive recording media of the present invention contain a thermoplastic resin shell and a hollow part surrounded by the shell. The hollow resin particles of the present invention are specifically described below.

Hollow Resin Particles for Thermosensitive Recording Media

Figure 1:
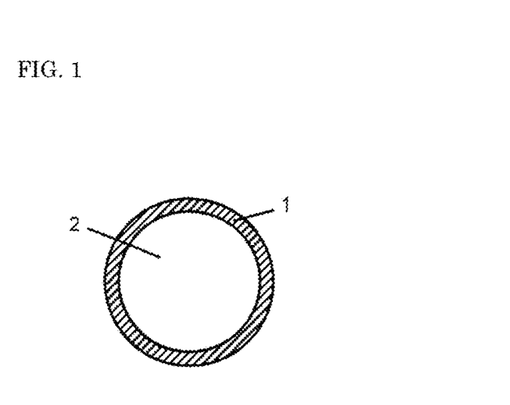
FIG. 1 is a schematic diagram of an example of the hollow resin particles.

As shown in FIG. 1, the hollow resin particles for thermosensitive recording media (hereinafter sometimes simply referred to as hollow resin particles) contain a thermoplastic resin shell and a hollow part surrounded by the shell. The hollow resin particles are almost spherical and have a hollow part therein which forms a large cavity inside the hollow resin particles. The shape of the hollow resin particles can be exemplified by a soft tennis ball.

The shell of the hollow resin particles has continuous inner and outer surfaces without edges and ends. The thickness of the shell, i.e., the distance between the inner and outer surfaces is preferably uniform though nonuniform thickness is acceptable.

The hollow resin particles for thermosensitive recording media of the present invention contain a thermally-vaporizable hydrocarbon (hereinafter also referred to as a hydrocarbon).

The hydrocarbon is not specifically restricted and includes, for example, linear hydrocarbons, such as propane, butane, pentane, hexane, heptane, octane, nonane, decane, dodecane, undecane, tridecane, tetradecane, pentadecane and hexadecane; branched hydrocarbons, such as isobutane, isopentane, isohexane, isoheptane, isooctane, isononane, isodecane, isododecane, 3-methyl undecane, isotridecane, 4-methyl dodecane, isotetradecane, isopentadecane and isohexadecane; and alicyclic hydrocarbons, such as cyclopentane, cyclohexane, cycloheptane, cyclooctane, cyclononane, cyclodecane and cyclododecane. The hydrocarbons can be used alone or as a combination of at least two of the hydrocarbons.

The hydrocarbon is essentially gaseous and encapsulated in the hollow part of the hollow resin particles. Some of the hydrocarbon can be encapsulated in the hollow resin particles in a form of a liquid or solid.

In one embodiment of the present invention, the hydrocarbon preferably contains at least one hydrocarbon selected from $C_3$-$C_{12}$ hydrocarbons, more preferably at least one hydrocarbon selected from $C_3$-$C_8$ hydrocarbons, and most preferably at least one hydrocarbon selected from $C_3$-$C_6$ hydrocarbons to achieve the effect of the present invention, though it does not restrict the selection of the hydrocarbon in the present invention.

In another embodiment of the present invention, the hydrocarbon preferably contains a hydrocarbon (A) having a boiling point of 60° C. or lower to achieve the effect of the present invention. The upper limit of the boiling point of the hydrocarbon (A) is not specifically restricted, and is preferably be 50° C. and more preferably be 40° C. On the other hand, the lower limit of the boiling point of the hydrocarbon (A) is preferably −25° C. and more preferably −15° C.

The hollow resin particles for thermosensitive recording media of the present invention contain a thermally-vaporizable hydrocarbon in an encapsulation ratio of at least 0.2 wt %. The hollow part of such hollow resin particles has a high internal pressure to resist the high pressure applied by super-calendar processing and minimize deformation, i.e., shrinking or denting, of the hollow resin particles. The effect contributes to the manufacture of thermosensitive recording media having a high sensitivity and achieving high precision.

The encapsulation ratio of the hydrocarbon in the hollow resin particles is at least 0.2 wt %. An encapsulation ratio lower than 0.2 wt % results in low internal pressure of the hollow part of the hollow resin particles (hereinafter also referred to as the internal pressure of hollow resin particles) to lead to the deformation of the hollow resin particles and low sensitivity and precision of the resultant thermosensitive recording media. The encapsulation ratio of the hydrocarbon is preferably at least 0.5 wt % and more preferably at least 1.0 wt %. The upper limit of the encapsulation ratio of the hydrocarbon is preferably 20 wt %. An encapsulation ratio of the hydrocarbon higher than 20 wt % can thin the shell of the hollow resin particles and decrease the pressure resistance of the hollow resin particles to decease the sensitivity and precision of the resultant thermosensitive recording media. The encapsulation ratio of the hydrocarbon is determined according to the method described in the Example.

The shell of the hollow resin particles contains a thermoplastic resin.

The thermoplastic resin constituting the shell is a polymer of a polymerizable component which essentially contains a monomer having a radically reactive carbon-carbon double bond per molecule (hereinafter also referred to as the monomer) and can contain a cross-linking agent having at least two radically reactive carbon-carbon double bonds per molecule. Both the monomer and cross-linking agent can perform addition reaction and the cross-linking agent can introduce a crosslinked structure into the thermoplastic resin.

The monomer is not specifically restricted and includes, for example, nitrile monomers such as acrylonitrile, methacrylonitrile, fumaronitrile and maleonitrile; vinyl halide monomers, such as vinyl chloride; vinylidene halide monomers, such as vinylidene chloride; vinyl ester monomers, such as vinyl acetate, vinyl propionate and vinyl butyrate; carboxyl-group-containing monomers, such as (meth)acrylic acid, ethacrylic acid, crotonic acid, cinnamic acid, maleic acid, itaconic acid and fumaric acid; anhydrides of monomers having two carboxyl groups per molecule; (meth)acrylate monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrrolidone; and vinyl naphthalene salts. A part of or the whole of the carboxyl groups of the carboxyl-group-containing monomers can be neutralized during or after the polymerization. Acrylic acids and methacrylic acids can be collectively referred to as (meth)acrylic acids. The word, (meth)acrylate, means acrylate or methacrylate and the word, (meth)acryl, means acryl or methacryl. One of or a combination of at least two of the monomers can be used.

The polymerizable component containing a nitrile monomer is preferable for producing a thermoplastic resin with high gas barrier effect that enables the resultant hollow resin particles to adequately retain the hydrocarbon encapsulated therein and increase their internal pressure.

The amount of the nitrile monomer in the polymerizable component is not specifically restricted and is preferably at least 80 wt %, more preferably at least 85 wt %, further more preferably at least 90 wt % and most preferably at least 95 wt %. The upper limit of the amount of the nitrile monomer is preferably 100 wt %. An amount of the nitrile monomer less than 80 wt % can impair the retention of the hydrocarbon encapsulated in the resultant hollow resin particles to decrease the internal pressure of the hollow resin particles. Such hollow resin particles can crush when they are used to manufacture thermosensitive recording media and decrease the sensitivity and precision of the resultant thermosensitive recording media.

The nitrile monomer essentially containing both acrylonitrile (hereinafter also referred to as AN) and methacrylonitrile (hereinafter also referred to as MAN) is preferable for producing a thermoplastic resin that has a high gas-barrier effect and improved rigidity and elasticity that minimize the deformation of the resultant hollow resin particles and impart high expansion performance to the hollow resin particles.

The weight ratio of AN to MAN (AN to MAN ratio) in the nitrile monomer is not specifically restricted, and preferably ranges from 10:90 to 90:10. An AN to MAN ratio smaller than 10:90 can lead to insufficient gas-barrier effect of the resultant hollow resin particles and such particles can crush when used for manufacturing thermosensitive recording media to cause low sensitivity of the resultant thermosensitive recording media. On the other hand, an AN to MAN ratio greater than 90:10 can lead to insufficient expansion performance and heat resistance of the resultant hollow resin particles, and such particles do not exhibit a sufficient effect for manufacturing thermosensitive recording media to cause low sensitivity of the resultant thermosensitive recording media. The upper limit of the AN to MAN ratio is preferably 80:20, more preferably 75:25 and most preferably 70:30. The lower limit of the AN to MAN ratio is preferably 20:80, more preferably 25:75 and most preferably 30:70.

The polymerizable component can contain a cross-linking agent as mentioned above. The thermoplastic resin polymerized with a cross-linking agent has high rigidity and elasticity.

The cross-linking agent is not specifically restricted and includes, for example, aromatic divinyl compounds, such as divinyl benzene; and polyfunctional (meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, neopentyl glycol di(meth)acrylate, polytetramethylene glycol diacrylate, 1,4-butanediol di(meth)acrylate, 1,6-hexanediol di(meth)acrylate, 1,9-nonanediol di(meth)acrylate, PEG (200) di(meth)acrylate, PEG (400) di(meth)acrylate, PEG (600) di(meth)acrylate, trimethylolpropane tri(meth)acrylate, pentaerythritol tri(meth)acrylate, pentaerythritol tetraacrylate, dipentaerythritol hexaacrylate, 2-butyl-2-ethyl-1, 3-propane diol diacrylate, and tricyclodecane dimethanol di(meth)acrylate. One of or a combination of at least two of the cross-linking agents can be used.

The amount of the cross-linking agent in the polymerizable component is not specifically restricted, and preferably ranges from 0 to 10.0 wt %, though the cross-linking agent cannot be contained in the polymerizable component. The upper limit of the amount of the cross-linking agent is preferably 8.0 wt % and more preferably 5.0 wt %. The lower limit of the amount of the cross-linking agent is preferably 0.1 wt %, more preferably 0.3 wt % and further more preferably 0.5 wt %. An amount of the cross-linking agent higher than 10.0 wt % can lead to fragile hollow resin particles that crush in super-calendar processing when used for manufacturing thermosensitive recording media to decrease the sensitivity and precision of the resultant thermosensitive recording media.

The mean volume particle size (hereinafter also referred to as mean particle size) of the hollow resin particles is not specifically restricted and preferably ranges from 0.1 to 10 µm. The hollow resin particles having a mean particle size smaller than 0.1 µm can have thin shell and decreased pressure resistance that can cause the deformation of the hollow resin particles in super-calendar processing for manufacturing thermosensitive recording media to decrease the sensitivity of the resultant thermosensitive recording media. The hollow resin particles having a mean particle size greater than 10 µm can impair the smoothness of the recording surface of the resultant thermosensitive recording media to decrease their precision. The upper limit of the mean particle size of the hollow resin particles is preferably 8 µm and more preferably 6 µm. The lower limit of the mean particle size of the hollow resin particles is preferably 0.5 µm and more preferably 1.0 m. The mean volume particle size of the hollow resin particles is determined in the method described in the Examples.

The hollow ratio of the hollow resin particles is not specifically restricted and preferably ranges from 71 to 95%. Hollow resin particles having a hollow ratio lower than 71% can have a low thermal insulation property that decreases the effect of the hollow resin particles in thermosensitive recording media to decrease the sensitivity of the resultant thermosensitive recording media. On the other hand, hollow resin particles having a hollow ratio higher than 95% have a thin shell and decreased pressure resistance that can cause the deformation of the hollow resin particles in super-calendar processing for manufacturing thermosensitive recording media to decrease the sensitivity of the resultant thermosensitive recording media. The upper limit of the hollow ratio of the hollow resin particles is preferably 94% and more preferably 93%. The lower limit of the hollow ratio of the hollow resin particles is preferably 75% and more preferably 80%. The hollow ratio of the hollow resin particles is determined in the method described in the Examples.

The hollow resin particles preferably have compression recovery to improve their pressure resistance and prevent the deformation of the particles in super-calendar processing.

The compression recovery rate of the hollow resin particles is not specifically restricted, and is preferably at least 40%, more preferably at least 50%, further more preferably at least 60% and most preferably at least 70%. Hollow resin particles having a compression recovery rate lower than 40% can deform in super-calendar processing for manufacturing thermosensitive recording media to decrease the sensitivity of the resultant thermosensitive recording media.

The compression recovery rate of the hollow resin particles is determined in the method described in the Examples.

Manufacturing Process of Hollow Resin Particles for Thermosensitive Recording Media The manufacturing process of the hollow resin particles for thermosensitive recording media includes, for example, a process with two steps: the polymerization step in which heat-expandable microspheres are produced by dispersing an oily mixture containing a polymerizable component and hydrocarbon in an aqueous dispersion medium and by polymerizing the polymerizable component; and the expansion step in which hollow resin particles for thermosensitive recording media are manufactured by thermally expanding the heat-expandable microspheres.

Polymerization Step

In the polymerization step, heat-expandable microspheres are produced by dispersing an oily mixture containing a polymerizable component and hydrocarbon in an aqueous dispersion medium and by polymerizing the polymerizable component.

The polymerizable component is preferably polymerized in the presence of a polymerization initiator. The polymerization initiator can be contained in the oily mixture along with the polymerizable component and hydrocarbon. The polymerization initiator is not specifically restricted, and includes, for example, peroxide compounds, such as diisopropyl peroxycarbonate, dioctyl peroxydicarbonates, t-butyl peroxylaurate, lauroyl peroxide, dioctanoyl peroxide and benzoyl peroxide; and azo compounds, such as azobisisobutylonitrile, azobis (2,4-dimethyl valeronitrile), 1,1'-azobis (cyclohexane-1-carbonitrile) and dimethyl 2,2'-azobis (2-methyl propionate). One of or a combination of at least two of the polymerization initiators can be used.

The aqueous dispersion medium contains water, such as deionized water, as the main component to disperse the oily mixture therein.

The aqueous dispersion medium can contain a dispersion stabilizer and the like. The dispersion stabilizer is not specifically restricted and includes, for example, colloidal silica. The amount of the dispersion stabilizer in the aqueous dispersion medium can optionally be changed depending on the oily mixture.

The aqueous dispersion media can further contain a dispersion stabilizing auxiliary. The dispersion stabilizing auxiliary is not specifically restricted and includes, for example, a condensate of diethanol amine and adipic acid, polyethylene imine and polyvinyl pyrrolidone. The amount of the dispersion stabilizing auxiliary in the aqueous dispersion medium can optionally be changed depending on the oily mixture.

The aqueous dispersion medium can further contain an electrolyte, such as sodium chloride, magnesium chloride, and sodium sulfate. The amount of the electrolyte in the aqueous dispersion medium can optionally be changed depending on the oily mixture.

In the polymerization step, the oily mixture is dispersed and emulsified in the aqueous dispersion medium to be formed into oil globules of a prescribed particle size.

The methods for dispersing and emulsifying the oily mixture include generally known dispersion techniques, such as the technique with a device, such as Homo-mixer or Static mixer, membrane emulsification technique, and ultrasonic dispersion.

The suspension polymerization is then started by heating the dispersion in which the oily mixture is dispersed into oil globules in the aqueous dispersion medium. During the polymerization reaction, the dispersion is preferably agitated gently to prevent floating of monomers and sedimentation of polymerized heat-expandable microspheres.

The polymerization temperature can optionally be set depending on the variant of the polymerization initiator, and is preferably adjusted within a range from 40 to 100° C., and more preferably from 50 to 90° C. The polymerization temperature is preferably maintained for about 0.1 to 20 hours.

Expansion Step

The method for the expansion step is not specifically restricted so far as the heat-expandable microspheres can be thermally expanded, and includes known dry thermal expansion and wet thermal expansion methods.

The heating method for the expansion step is not specifically restricted and includes, for example, a method using a generally known contact heat transfer device or direct heating device. The heating temperature can be optionally set according to the types of heat-expandable microspheres and expansion methods and preferably ranges from 60 to 350° C.

The hollow resin particles can be used in a form of water-containing hollow resin particles composition for thermosensitive recording media (hereinafter also referred to as hollow resin particles composition) for manufacturing thermosensitive recording media. The solid content concentration of the hollow resin particles composition for thermosensitive recording media is not specifically restricted, and preferably ranges from 1 to 99 wt %, more preferably from 15 to 85 wt % and further more preferably from 30 to 70 wt %. The solid content concentration of the hollow resin particle composition for thermosensitive recording media is measured according to the method described in the Examples.

The thermosensitive recording media containing the hollow resin particles for thermosensitive recording media of the present invention have high sensitivity and precision because the hollow resin particles are resistant enough to crush by calendar processing.

Figure 2:
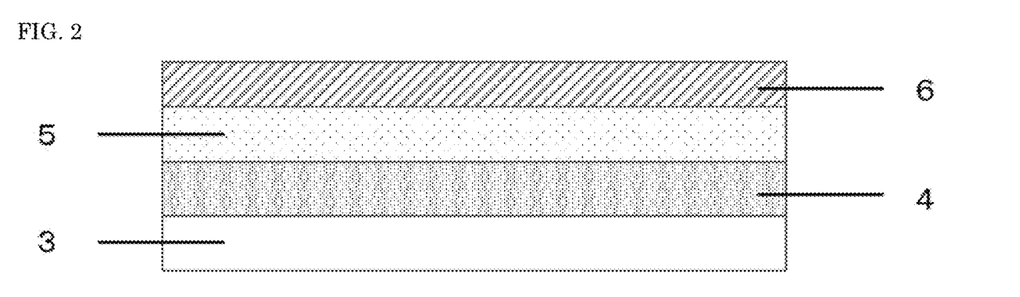
FIG. 2 is a schematic diagram of an example of the thermosensitive recording media.
Figure 3:
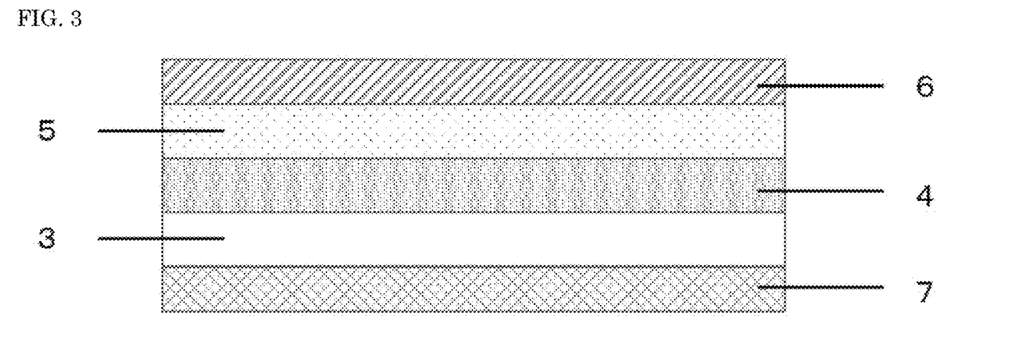
FIG. 3 is a schematic diagram of an example of the thermosensitive recording media.

The thermosensitive recording media (hereinafter also referred to as recording media) includes those manufactured in a form, for example, as shown in FIG. 2, that contains a substrate 3 and layers including an under layer 4, thermosensitive recording layer 5 and protective layer 6 which are layered on at least one of the surfaces of the substrate in this order; or in another form as shown in FIG. 3, that contains a substrate 3, layers including an under layer 4, thermosensitive recording layer 5 and protective layer 6 which are layered on at least one of the surfaces of the substrate in this order, and an adhesive layer 7 which is on the surface of the substrate opposite to the surface on which the thermosensitive layer is formed. Further, the recording media can have other layers if required.

Under Layer

The hollow resin particles are preferably contained in the under layer for achieving the effect of the present invention. The amount of the hollow resin particles contained in the under layer is not specifically restricted, and preferably ranges from 20 to 50 wt % and more preferably from 30 to 40 wt %.

The under layer contains a binder resin (A). The under layer can contain a cross-linking component (A) and other components if required.

The binder resin (A) is not specifically restricted, and is preferably at least one selected from water-soluble polymers and aqueous polymer emulsions.

The water-soluble polymers are not specifically restricted and include, for example, polyvinyl alcohol; modified polyvinyl alcohols, such as carboxyl-group-containing polyvinyl alcohol; starches and their derivatives; cellulose derivatives, such as methoxy cellulose, hydroxyethyl cellulose, carboxymethyl cellulose, methyl cellulose and ethyl cellulose; polyurethane; sodium polyacrylate; polyvinylpyrrolidone; acrylamide-acrylate ester copolymer; acrylamide-acrylate ester-methacrylic acid terpolymer; alkali salt of styrene-maleic acid anhydride copolymer; alkali salt of isobutylene-maleic acid anhydride copolymer; polyacrylamide; sodium alginate; gelatin; and casein. One of or a combination of at least two of the water-soluble polymers can be used.

The aqueous polymer emulsion is not specifically restricted an includes, for example, emulsions of acrylate resin; modified acrylate resin, such as carboxyl-group-containing acrylate resin; latexes, such as styrene-butadiene copolymer and styrene-butadiene-acrylic copolymer; vinyl acetate resin, vinyl acetate-acrylic acid copolymer, styrene-acrylate ester copolymer, acrylate ester resin, and polyurethane resin. One of or a combination of at least two of the aqueous polymer emulsions can be used.

The amount of the binder resin (A) in the under layer is not specifically restricted, and preferably ranges from 30 to 300 parts by weight to 100 parts by weight of the hollow resin particles and more preferably from 40 to 200 parts by weight.

The cross-linking component (A) is not specifically restricted and includes, for example, oxazoline-group-containing compounds, glyoxal derivatives, methylol derivatives, epichlorohydrin derivatives, epoxy compounds, aziridine compounds, hydrazine, hydrazide derivatives, and carbodiimide derivatives. One of or a combination of at least two of the cross-linking components can be used.

Other components to be contained in the under layer include, for example, surfactants, inorganic fillers, organic fillers, and lubricants.

The method for forming the under layer is not specifically restricted, and the under layer can be formed, for example, by applying an under-layer liquid, which is prepared by dispersing and mixing the binder resin, hollow particles, water and, if required, a cross-linking component and other components by a disperser, on a substrate and by drying the applied liquid.

The application technique for the under-layer liquid is not specifically restricted and includes, for example, blade coating, gravure coating, gravure offset coating, bar coating, roll coating, knife coating, air knife coating, comma coating, U-comma coating, AKKU coating, smoothing coating, micro gravure coating, reverse roll coating, four or five-roll coating, dip coating, curtain coating, slide coating and slot die coating.

The deposition amount of the under layer after drying is not specifically restricted, and preferably ranges from 0.5 to 5 g/m$^2$ and more preferably from 1 to 5 g/m$^2$.

Substrate

The shape, structure, size, and material of the substrate are not specifically restricted and can be selected according to the intended use. The shape of the substrate includes, for example, flat plate and sheet. The structure of the substrate can either be a single layer or multi-layered structure and the size can be selected according to the size of the recording media to be manufactured.

The material of the substrate includes, for example, inorganic materials, organic materials, synthetic paper, and synthetic resin film. The substrate can be composed of one of or at least two of the materials.

The inorganic materials include, for example, glass, quartz, silicone, silicone oxide, aluminum oxide, $SiO_2$ and metals.

The organic materials are not specifically restricted and include, for example, acid paper, neutralized paper, wood-free paper, and cellulose derivatives, such as cellulose triacetate.

The synthetic paper is not specifically restricted and includes, for example, papers composed of synthetic fibers, such as polyethylene, polypropylene, polyethylene terephthalate and polyamide fibers; and paper prepared by adhering synthetic fiber on a part of a surface or entire surface or both surfaces of paper.

The synthetic film includes, for example, polypropylene film, polyethylene film, polycarbonate film, polystyrene film and polymethyl methacrylate film. These films can contain microvoids which are formed during film forming or drawing.

The average thickness of the substrate is not specifically restricted, and preferably ranges from 10 to 2000 m and more preferably from 20 to 1000 μm.

Thermosensitive Recording Layer

The thermosensitive recording layer contains a leuco dye, developer, and a binder resin (B). The thermosensitive recording layer can contain other components if required.

The leuco dye is not specifically restricted and includes, for example, leuco compounds, such as triphenylmethanes, fluorans, phenothazines, auramines, spiropyrans and indolinophthalides.

The leuco dye is not specifically restricted and can optionally be selected according to the intended use. The leuco dye includes, for example, 3,3-bis(p-dimethylaminophenyl)-phthalide, 3,3-bis(p-dimethylaminophenyl)-6-dimethylaminophthalide, 3,3-bis(p-dimethylaminophenyl)-6-diethylaminophthalide, 3,3-bis(p-dimethylaminophenyl)-6-chlorphthalide, 3,3-bis(p-dibutylaminophenyl)phthalide, 3-cyclohexly amino-6-chlorfluoran, 3-dimethylamino-5,7-dimethylfluoran, 3-diethylamino-7-chlorfluoran, 3-diethylamino-7-methylfluoran, 3-diethylamino-7,8-benzofluoran, 3-diethylamino-6-methyl-7-chlorfluoran, 3-(N-p-tolyl-N-ethylamino)-6-methyl-7-anilinofluoran, 2-{N-(3'-trifluoromethylphenyl)amino}-6-diethylaminofluoran, 2-{3,6-bis (diethylamino)-9-(o-chloranilino)xanthyl benzoate lactam}, 3-diethylamino-6-methyl-7-(m-trichloromethylanilino)fluoran, 3-diethylamino-7-(o-chloranilino)fluoran, 3-pyrrolizino-6-methyl-7-anilinofluoran, 3-di-n-butylamino-7-o-chloranilino)fluoran, 3-N-methyl-N,n-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzylamino) fluoran, benzoyl leucomethylene blue, 6'-chloro-8'-methoxy-benzoindorino-spiropyran, 6'-bromo-3'-methoxy-benzoindorino-spiropyran, 3-(2'-hydroxy-4'-dimethylaminophenyl)-3-(2'-methoxy-5'chlorphenyl) phthalide, 3-(2'-hydroxy-4'-dimethylaminophenyl)-3-(2'-methoxy-5'-nitrophenyl) phthalide, 3-(2'-hydroxy-4'-diethylaminophenyl)-3-(2'-methoxy-5'-methylphenyl) phthalide, 3-(2'-methoxy-4'-dimethylaminophenyl)-3-(2'-hydroxy-4'-chlor-5'-methylphenyl)phthalide, 3-(N-ethyl-N-tetrahydrofurfuryl)amino-6-methyl-7-anilinofluoran, 3-N-ethyl-N-(2-ethoxypropyl)amino-6-methyl-7-anilinofluoran, 3-N-methyl-N-isobutyl-6-methyl-7-anilinofluoran, 3-morpholino-7-(N-propyl-trifluoromethylanilino)fluoran, 3-pyrrolidino-7-trifluoromethylanilino fluoran, 3-diethylamino-5-chloro-7-(N-benzyl-trifluoromethylanilino)fluoran, 3-pyrrolidino-7-(di-p-chlorphenyl)methylaminofluoran, 3-diethylamino-5-chlor-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-n-butylanilino)fluoran, 3-dibutylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chlor-7-anilinofluoran, 3-diethylamino-6-methyl-7-mesitidino-4',5'-benzofluoran, 3-N-methyl-N-isopropyl-6-methyl-7-anilinofluoran, 3-N-ethyl-N-isoamyl-6-methyl-7-anilinofluoran, 3-diethylamino-6-methyl-7-(2',4'-dimethylanilino)fluoran, 3-morpholino-7-(N-propyl-trifluoromethylanilino) fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorphenyl)methylaminofluoran, 3-diethylamino-5-chlor-(α-phenylethylanilino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyltoluidino)-7-(p-N-butylanilino)fluoran, 3,6-bis(dimethylamino)fluorenespiro(9,3)-6'-dimethylaminophthalide, 3-(N-benzyl-N-cyclohexylamino)-5,6-benzo-7-α-naphthylamino-4'-bromofluoran, 3-diethylamino-6-chlor-7-anilinofluoran, 3-N-ethyl-N-(-2-ethoxypropyl)amino-6-methyl-7-anilinofluoran, 3-N-ethyl-N-tetrahydrofurfurylamino-6-methyl-7-anilinofluoran, 3-diethylamino-6-methyl-7-mesitidino-4',5'-benzofluoran, 3-p-dimethylaminophenyl)-3-{1,1-bis (p-dimethylaminophenyl)ethylene-2-yl}phthalide, 3-(p-dimethylaminophenyl)-3-{1,1-bis (p-dimethylaminophenyl)ethylene-2-yl}-6-dimethylaminophthalide, 3-(p-dimethylaminophenyl)-3-(1-p-dimethylaminophenyl-1-phenylethylene-2-yl)phthalide, 3-(p-dimethylaminophenyl)-3-(1-p-dimethylaminophenyl-1-p-chlorophenylethylene-2-yl)-6-dimethylaminophthalide, 3-(4'-dimethylamino-2'-methoxy)-3-(1"-p-dimethylaminophenyl-1"-p-chlorophenyl-1",3"-butadiene-4"-yl)benzophthalide, 3-(4'-dimethylamino-2'-benzyloxy)-3-(1"-p-dimethylaminophenyl-1"-phenyl-1",3"-butadiene-4"-yl) benzophthalide, 3-dimethylamino-6-dimethylamino-fluorene-9-spiro-3'-(6'-dimethylamino)phthalide, 3,3-bis(2-(p-dimethylaminophenyl)-2-p-methoxyphenyl)ethenyl)-4,5,6,7-tetrachlorophthalide, 3-bis{1,1-bis(4-pyrrolidinophenyl)ethylene-2-yl}-5,6-dichloro-4,7-dibromo phthalide, bis(p-dimethylaminostyryl)-1-naphthalenesulfonylmethane, and bis(p-dimethylaminostyryl)-1-p-tolylsulfonylmethane. One of or a combination of at least two of the leuco dyes can be used.

The developer includes electron-accepting compounds and oxidizing agents that develop the color of the leuco dyes. The developer is not specifically restricted and includes, for example, 4,4'-isopropylidene bisphenol, 4,4'-isopropylidene bis(o-methylphenol), 4,4'-secondary butylidene bisphenol, 4,4'-isopropylidene bis(2-tertiary butylphenol), p-nitro zinc benzoate, 1,3,5-tris(4-tertiarybutyl-3-hydroxy-2,6-dimethylbenzyl)isocyanurate, 2,2-(3,4'-dihydroxydiphenyl)propane, bis(4-hydroxy-3-methylphenyl)sulfide, 4-{β-(p-methoxyphenoxy)ethoxy}salicylate, 1,7-bis (4-hydroxyphenylthio)-3,5-dioxaheptane, 1,5-bis (4-hydroxyphenylthio)-5-oxapentane, monobenzyl phthalate monocalcium salt, 4,4'-cyclohexylidene diphenol, 4,4'-isopropylidene bis(2-chlorophenol), 2,2'-methylene bis(4-methyl-6-tertiarybutylphenol), 4,4'-butylidene bis(6-tertiary butyl-2-methyl) phenol, 1,1,3-tris (2-methyl-4-hydroxy-5-tertiarybutylphenyl)butane, 1,1,3-tris (2-methyl-4-hydroxy-5-cyclohexylphenyl)butane, 4,4'-thiobis(6-tertiarybutyl-2-methyl)phenol, 4,4'-diphenol sulfone, 4-isopropoxy-4'-hydroxydiphenyl sulfone, 4-benzyloxy-4'-hydroxydiphenyl sulfone, 4,4'-diphenol sulfoxide, p-hydroxy isopropyl benzoate, p-hydroxy benzyl benzoate, benzyl protocatechuate, stearyl gallate, lauryl gallate, octyl gallate, 1,3-bis(4-hydroxyphenylthio)-propane, N,N'-diphenyl thiourea, N,N'-di(m-chlorophenyl) thiourea, salicylanilide, bis(4-hydroxyphenyl) methyl acetate, bis-(4-hydroxyphenyl)benzyl acetate, 1,3-bis(4-hydroxycumyl) benzene, 1,4-bis(4-hydroxycumyl) benzene, 2,4'-diphenol sulfone, 2,2'-diallyl-4,4'-diphenol sulfone, 3,4-dihydroxyphenyl-4'-methyldiphenyl sulfone, zinc 1-acetyloxy-2-naphthoate, zinc 2-aceyloxy-1-naphthoate, zinc 2-acetyloxy-3-naphthoate, α,α-bis(4-hydroxyphenyl)-α-methyl toluene, antipyrine complex of zinc thiocyanate, tetrabromo bisphenol A, tetrabromo bisphenol S, 4,4'-thiobis(2-methylphenol), and 4,4'-thiobis(2-chlorophenol). One of or a combination of at least two of the developers can be used.

The amount of the developer is not specifically restricted, and preferably ranges from 1 to 20 parts by weight to 1 part by weight of a leuco dye and more preferably from 2 to 10 parts by weight.

The binder resin (B) is not specifically restricted and includes, for example, polyvinyl alcohol resin, starches and their derivatives; cellulose derivatives, such as hydroxymethyl cellulose, hydroxyethyl cellulose, carboxymethyl cellulose, methyl cellulose and ethyl cellulose; water-soluble polymers, such as sodium polyacrylate, polyvinyl pyrrolidone, acryl amide-acrylate ester copolymer, acryl amide-acrylate ester-methacrylic acid terpolymer, alkali salts of styrene-maleic acid anhydride copolymer, alkali salts of isobutylene-maleic acid anhydride copolymer, polyacrylamide, sodium alginate, gelatin and casein; emulsions of polymers, such as polyvinyl acetate, polyurethane, polyacrylic acid, polyacrylate ester, vinyl chloride-vinyl acetate copolymer, polybutyl methacrylate and ethylene-vinyl acetate copolymer; and latexes, such as styrene-butadiene copolymer and styrene-butadiene-acrylic copolymer. One of or a combination of at least two of the binder resins (B) can be used.

The thermosensitive recording layer can contain a sensitivity improver, if required. The sensitivity improver is not specifically restricted and includes, for example, fatty acids, such as stearic acid and behenic acid; fatty acid amides, such as stearic acid amide and palmitic acid amide; fatty acid metal salts, such as zinc stearate, aluminum stearate, calcium stearate, zinc palmitate and zinc behenate; p-benzyl biphenyl, terphenyl, triphenyl methane, benzyl p-benzyloxybenzoate, β-benzyloxy naphthalene, phenyl β-naphthoate, phenyl 1-hydroxy-2-naphthoate, methyl 1-hydroxy-2-naphthoate, diphenyl carbonate, glycol carbonate, dibenzyl terephthalate, dimethyl terephthalate, 1,4-dimethoxy naphthalene, 1,4-diethoxy naphthalene, 1,4-dibenzyloxy naphthalene, 1,2-diphenoxy ethane, 1,2-bis(3-methylphenoxy) ethane, 1,2-bis(4-methylphenoxy) ethane, 1,4-diphenoxy-2-butene, 1,2-bis (4-methoxyphenylthio) ethane, dibenzoyl methane, 1,4-diphenyl thiobutane, 1,4-diphenyl thio-2-butene, 1,3-bis(2-vinyloxyethoxy) benzene, 1,4-bis(2-vinyloxyethoxy) benzene, p-(2-vinyloxyethoxy) biphenyl, p-aryloxy biphenyl, p-propargyloxy biphenyl, dibenzoyloxy methane, dibenzoyloxy propane, dibenzyl disulfide, 1,1-diphenyl ethanol, 1,1-diphenyl propanol, p-benzyloxy benzyl alcohol, 1,3-phenoxy-2-propanol, N-octadecylcarbamoyl-p-methoxycarbonyl benzene, N-octadecylcarbamoyl benzene, 1,2-bis(4-methoxyphenoxy) propane, 1,5-bis(4-methoxyphenoxy)-3-oxapentane, dibenzyl oxalate, bis(4- methylbenzyl) oxalate and bis(4-chlorobenzyl) oxalate. One of or a combination of at least two of the sensitivity improvers can be used.

The thermosensitive recording layer can contain an auxiliary additive, if required. The auxiliary additive includes, for example, hindered phenol compounds, such as 2,2'-methylenen bis(4-ethyl-6-tertiarybutyl phenol), 4,4'-butylidene bis(6-tertiarybutyl-2-methyl phenol), 1,1,3-tris(2-methyl-4-hydroxy-5-tertiarybutylphenyl) butane, 1,1,3-tris(2-methyl-4-hydroxy-5-cyclohexylphenyl) butane, 4,4'-thiobis(6-tertiarybutyl-2-methyl phenol), tetrabromo bisphenol A, tetrabromo bisphenol S, 4,4'-thiobis(2-methyl phenol) and 4,4'-thiobis(2-chlorophenol); and hindered amine compounds, such as tetrakis(1,2,2,6,6-pentamethyl-4-piperidyl)-1,2,3,4-butanetetracarboxylate and tetrakis(1,2,2,6,6-tetramethyl-4-piperidyl)-1,2,3,4-butanetetracarboxylate.

Other components contained in the thermosensitive recording layer include, for example, surfactants, lubricants, and fillers.

The lubricants include, for example, higher fatty acids and their metal salts, higher fatty acid amides, higher fatty acid esters, animal waxes, vegetable waxes, mineral waxes, and petroleum waxes.

The fillers include, for example, inorganic fine powders, such as calcium carbonate, silica, zinc oxide, titanium oxide, aluminum hydroxide, zinc hydroxide, barium sulfate, clay, kaolin, talc, surface-treated calcium, and surface-treated silica; and organic fine powders, such as urea-formalin resin, styrene-methacrylate copolymer, polystyrene resin, and vinylidene chloride resin.

The thermosensitive recording layer can be formed by generally known methods, for example, a method including the steps of preparing a thermosensitive recording layer liquid by grinding a leuco dye and developer together with a binder resin (B) and other components with a dispersing device, such as a ball-mill, attritor and sand mill, to disperse the mixture to a particle size ranging from 0.1 to 3 μm and adding a dispersion of a filler and sensitivity improver if required; applying the thermosensitive recording layer liquid on a under layer; and drying the liquid to form a thermosensitive recording layer.

The application method of the thermosensitive recording layer liquid is not specifically restricted, and includes, for example, blade coating, gravure coating, gravure offset coating, bar coating, roll coating, knife coating, air knife coating, comma coating, U-comma coating, AKKU coating, smoothing coating, micro gravure coating, reverse roll coating, four or five-roll coating, dip coating, curtain coating, slide coating and slot die coating.

The deposition amount of the thermosensitive recording layer after drying is not specifically restricted, and preferably ranges from 1 to 20 g/m² and more preferably from 3 to 10 g/m².

Protective Layer

The protective layer contains a binder resin (C) and can contain, if required, a cross-linking component (B) and other components.

The binder resin (C) is not specifically restricted, and preferably is a water-soluble resin.

The water-soluble resin includes, for example, polyvinyl alcohols; modified polyvinyl alcohols, such as carboxyl-group-containing polyvinyl alcohol; starches and their derivative; cellulose derivatives, such as methoxy cellulose, hydroxyethyl cellulose, carboxymethyl cellulose, methyl cellulose and ethyl cellulose; sodium polyacrylate, polyvinyl pyrrolidone, acryl amide-acrylate ester copolymer, acryl amide-acrylate ester-methacrylic acid terpolymer, alkali salt of styrene-maleic acid anhydride copolymer, alkali salt of isobutylene-maleic acid anhydride copolymer, polyacrylamide, modified polyacrylamide, methylvinyl ether-maleic acid anhydride copolymer, carboxy-modified polyethylene, polyvinyl alcohol-acryl amide block copolymer, melamine-formaldehyde resin, urea-formaldehyde resin, sodium alginate, gelatin and casein. One of or a combination of at least two of the binder resins (C) can be used.

The cross-linking component (B) is not specifically restricted so far as it is reactive with the water-soluble resin, and includes, for example, glyoxal derivatives, methylol derivatives, epichlorohydrin, polyamide epichlorohydrin, epoxy compounds, aziridine compounds, hydrazine, hydrazide derivatives, oxazoline derivatives and carbodiimide derivatives. One of or a combination of at least two of the cross-linking components (B) can be used.

The method of forming the protective layer is not specifically restricted, and the layer can be formed by generally known methods.

The average thickness of the protective layer is not specifically restricted, and preferably ranges from 0.5 to 5 μm and more preferably from 1 to 3 μm.

Adhesive Layer

The adhesive layer contains an adhesive component.

Generally known adhesives can be used as the adhesive component, and include, for example, urea resin, melamine resin, phenol resin, epoxy resin, vinyl acetate resin, vinyl acetate-acrylic copolymer, ethylene-vinyl acetate copolymer, acrylic resin, polyvinyl ether resin, vinyl chloride-vinyl acetate copolymer, polystyrene resin, polyester resin, polyurethane resin, polyamide resin, chlorinate polyolefin resin, polyvinyl butyral resin, acrylate ester copolymer, methacrylate ester copolymer, natural rubber, cyanoacrylate resin and silicone resin.

The adhesive layer of the recording media can be formed on the surface of the substrate opposite the surface on which the thermosensitive layer is formed. The adhesive layer includes a layer formed only of an adhesive component (release-paper free type) and a layer having release paper on its bottom (release paper type), and are optionally used depending on need.

Other Layers

The recording media have other layers including a back layer.

The back layer can be formed on the surface of the substrate opposite the surface having a thermosensitive recording layer.

The back layer contains a filler and a binder resin (D). The back layer can contain a lubricant, pigment, and other components, if required.

Inorganic and organic fillers can be used as the filler. The inorganic fillers include, for example, carbonates, silicates, metal oxides and sulfate compounds. The organic fillers include, for example, silicone resin, cellulose resin, epoxy resin, nylon resin, phenol resin, polyurethane resin, urea resin, melamine resin, polyester resin, polycarbonate resin, styrene resin, acrylic resin, polyethylene resin, formaldehyde resin and polymethyl methacrylate resin.

The binder resin (D) is not specifically restricted and includes, for example, the same binder resins as the binder resin (B) of the thermosensitive recording layer.

The average thickness of the back layer is not specifically restricted, and preferably ranges from 0.1 to 20 μm and more preferably from 0.3 to 10 μm.

The shape of the recording media is not specifically restricted and includes, for example, the shapes of labels, sheet, and rolls. The shape can optionally be selected according to the intended use.

The recording process with the recording media is not specifically restricted and includes, for example, processes using a thermal head or laser beam.

The embodiment of the recording media includes, for example, thermosensitive recording labels and thermosensitive magnetic recording paper. The use of the recording media includes various fields, for example, POS systems for perishable foods, boxed lunches, and carry-outs; copying books and literature; ticketing by ticket-vending machines and printing receipt slips and bill of receipt; and baggage tags used by airline carriers.

EXAMPLE

The present invention is specifically described in the following Examples and Comparative examples, although the present invention is not restricted within the scope of these Examples and Comparative Examples. In the following Examples and Comparative Examples, "%" means "wt %" and "part(s)" means "part(s) by weight" unless otherwise specified. The hollow resin particles for thermosensitive recording media are also referred to as "hollow resin particles" or "hollow particles" for simplified description.

Encapsulation Ratio of Hydrocarbon Contained in Hollow Resin Particles

The encapsulation ratio of the hydrocarbon contained in hollow resin particles was measured by headspace gas chromatography as described below.

In a 20-mL headspace vial, 0.1 g of hollow resin particles was weighed and the headspace vial was tightly stoppered with a fluoro-resin-coated silicone rubber septum and an aluminum cap. The stoppered headspace vial was heated at 170° C. for 20 minutes and pressurized by helium for 0.5 minutes. Then 3 mL of the gas phase (headspace) was collected and introduced into a gas chromatograph to obtain the data for determining the encapsulation ratio of the hollow resin particles.

The conditions of the headspace gas chromatography were as follows.

Conditions

GC column: DB-624, 30 μm long, 0.25 mm in inner diameter, 1.40-μm wall thickness, manufactured by Agilent Technologies Detector: FID, 200° C.

Temperature elevation program: The column was held at 40° C. for 6 minutes, then heated to 200° C. by elevating the temperature at a rate of 20° C./min, and held at 200° C. for 3 minutes.

Inlet temperature: 200° C.

Amount of gas introduced: 3 mL

Helium flow rate: 1 mL/min

Split ratio: 10:1

The quantitative determination was performed by a calibration curve method including the following procedure.

Conditions for Quantification Procedure

A known amount of a sample was dissolved in DMF and 5 μL of the solution was measured in a 20-mL headspace vial. The headspace vial was tightly stoppered with a fluoro-resin-coated silicone rubber septum and an aluminum cap. The stoppered headspace vial was heated at 170° C. for 20 minutes and pressurized by helium for 0.5 minutes. Then, 3 mL of the gas phase (headspace) was collected and introduced into a gas chromatograph.

Mean Volume Particle Size of Hollow Resin Particles

The mean volume particle size of a sample of hollow resin particles was analyzed by a laser diffraction particle size analyzer (Microtrac ASVR, manufactured by Nikkiso Co., Ltd.). The mean volume diameter D50 determined in the analysis was defined as the mean volume particle size.

Solid Content Concentration of Hollow Resin Particles Composition for Thermosensitive Recording Media The moisture content of the hollow resin particles composition for thermosensitive recording media was measured by an Infrared Moisture Analyzer (FD-230, manufactured by Kett Electric Laboratory). The solid content concentration of the hollow resin particles composition for thermosensitive recording media was calculated from the value of the moisture content.

True Specific Gravity of Hollow Resin Particles

The true specific gravity of the hollow resin particles was determined by a liquid substitution method (Archimedean method) with isopropyl alcohol in an atmosphere at 25° C. and 50% RH (relative humidity) as described below.

At first, an empty 100-mL measuring flask was dried and weighed (WB1). Then isopropyl alcohol was poured into the weighed measuring flask accurately to form a meniscus, and the measuring flask filled with isopropyl alcohol was weighed (WB2).

The 100-mL measuring flask was then emptied, dried, and weighed (WS1). About 50 mL of the hollow resin particles was placed in the weighed measuring flask, and the measuring flask containing the hollow resin particles was weighed (WS2). Then, isopropyl alcohol was poured into the measuring flask containing the hollow resin particles to form a meniscus accurately without incorporating bubbles into the isopropyl alcohol, and the flask containing the hollow resin particles and isopropyl alcohol was weighed (WS3). The values, WB1, WB2, WS1, WS2, and WS3, were introduced into the following formula to calculate the true specific gravity (d) of the hollow resin particles.

$$d = \{(WS2-WS1) \times (WB2-WB1)/100\}/\{(WB2-WB1)-(WS3-WS2)\}$$

Hollow Ratio

Electron photomicrographs of the hollow resin particles were taken by a scanning electron microscope (VE-8800 manufactured by Keyence Corporation, 20 kV acceleration voltage, 2000 times magnification). Twenty hollow resin particles in the electron photomicrographs were randomly selected and their outer diameter and inner diameter (the diameter of the hollow part of the hollow particles) were inspected. The ratio between the outer and inner diameters was calculated from the inspected outer and inner diameters by the following formula and the average of the calculated ratios was defined as the hollow ratio of the hollow resin particles.

Hollow ratio (%)=(Inner diameter of a hollow resin particles/Outer diameter of a hollow resin particle)×100

Compression Recovery

In an aluminum cup of 6-mm diameter (5.65-mm inner diameter) and 4.8-mm depth, 2.00 mg of hollow resin particles was placed, and the layer of the hollow resin particles was covered with an aluminum cap of 5.6-mm diameter and 0.1-mm thickness to prepare a test sample. Then 2.5-N pressure was applied onto the aluminum cap by the compression unit of DMA (DMAQ800, manufactured by TA Instruments) in the environment at 70° C. and the height (L1) of the hollow resin particle layer in the cup was measured. Then the hollow resin particle layer was compressed by increasing the pressure from 2.5 N to 18 N at a rate of 10 N/min and then decompressed by decreasing the pressure from 18 N to 2.5 N at a rate of 10 N/min. The operation was conducted 8 times repeatedly, and after that the height (L2) of the hollow resin particle layer was measured while 2.5-N pressure was applied onto the aluminum cap by the compression unit. The ratio between the heights of the hollow resin particle layer, L1 and L2, were calculated by the following formula and defined as the compression recovery of the hollow resin particles.

Compression recovery (%)=(L2/L1)×100

Example 1

An aqueous dispersion medium was prepared by dissolving 100 g of colloidal silica (20-wt % effective concentration) and 3 g of adipic acid-diethanol amine condensate and adjusting the pH from 3.0 to 4.0.

An oily mixture was prepared by mixing 48 g of acrylonitrile, 112 g of methacrylonitrile, 40 g of methyl acrylate, 2 g of ethylene glycol dimethacrylate, 2 g of 2,2'-azobisisobutylonitrile and 60 g of isobutane.

The aqueous dispersion medium and the oily mixture were mixed and agitated with a Homo-mixer at 12,000 rpm for 5 min to be prepared into a suspension. Then, the suspension was transferred to a compressive reactor of 1.5-liter capacity, purged with nitrogen with the initial reaction pressure of 0.2 MPa and polymerized at 60° C. for 15 hours with agitation at 80 rpm to be processed into heat-expandable microspheres. The resultant heat-expandable microspheres A were heated according to the wet thermal expansion process described in Japanese Patent Application Publication 1987-201231 at an expansion temperature adjusted in the range from 100 to 140° C. to attain a desirable hollow ratio, and dehydrated by a centrifugal dehydrator to be prepared into the hollow resin particle composition A of 33-% solid content concentration (in other words, containing 67-% water) containing the hollow resin particles A. The properties of the resultant hollow resin particles A are shown in Table 4.

Examples 2 to 6 and Comparative Examples 1 to 4

The hollow resin particles B to I were produced and the hollow resin particle compositions B to I containing the particles, respectively, were prepared in the same manner as in Example 1, except that the components and amounts constituting the aqueous dispersion medium and oily mixture in Example 1 were replaced by those shown in Table 1. The solid content concentration of the hollow resin particle compositions B to I was adjusted to 33 wt % %. The properties of the hollow resin particles are shown in Table 1.

TABLE 1

| | | | | Examples | | | | |
|---|---|---|---|---|---|---|---|---|
| | | | | 1 | 2 | 3 | 4 | 5 |
| Aqueous dispersion medium | | | Deionized water | 500 | 500 | 500 | 500 | 500 |
| | | | NaCl | 0 | 100 | 0 | 100 | 0 |
| | | | Colloidal silica (20-wt % effective conc.) | 100 | 95 | 85 | 80 | 75 |
| | | | Adipic acid-diethanol amine condensate | 3 | 3 | 3 | 3 | 3 |
| Oily mixture | Polymerizable component | Monomers | AN | 48 | 144 | 102 | 54 | 124 |
| | | | MAN | 112 | 16 | 68 | 126 | 67 |
| | | | MA | 40 | 0 | 0 | 0 | 0 |
| | | | MMA | 0 | 20 | 30 | 10 | 0 |
| | | | IBX | 0 | 20 | 0 | 10 | 10 |
| | | Cross-linking agent | EDMA | 2 | 8 | 6 | 1 | 2 |
| | | Polymerization initiators | AIBN | 1.5 | 2 | 0 | 2.5 | 0 |
| | | | OPP | 0 | 0 | 3 | 0 | 2 |
| | Thermally- vaporizable hydrocarbons | | Isobutane (b.p.: −12° C.) | 60 | 55 | 50 | 45 | 40 |
| | | | Isopentane (b.p.: −28° C.) | 0 | 0 | 0 | 0 | 20 |
| | | | Isohexane (b.p.: 49-63° C.) | 0 | 0 | 0 | 15 | 0 |
| | | | Isooctane (b.p.: 99° C.) | 0 | 10 | 0 | 0 | 0 |
| | | | Isododecane (b.p.: 177° C.) | 0 | 5 | 0 | 0 | 0 |
| Total of monomers | | | | 200 | 200 | 200 | 200 | 200 |
| Amount of nitrile monomer in the polymerizable component | | | | 80 | 80 | 85 | 90 | 95 |
| Hollow resin particles | | | | Hollow resin particles A | Hollow resin particles B | Hollow resin particles C | Hollow resin particles D | Hollow resin particles E |
| Properties of hollow particles | | | Mean volume particle size (μm) | 2 | 3 | 3.5 | 5.5 | 4.8 |
| | | | True specific gravity | 0.29 | 0.11 | 0.13 | 0.20 | 0.11 |
| | | | Hollow ratio (%) | 72 | 90 | 88 | 75 | 90 |
| | | | Encapsulation ratio (wt %) | 0.20 | 0.79 | 4.1 | 3.5 | 8.3 |
| | | | Compression recovery (%) | 50 | 70 | 75 | 85 | 89 |

| | | | | Examples | Comparative Examples | | | |
|---|---|---|---|---|---|---|---|---|
| | | | | 6 | 1 | 2 | 3 | 4 |
| Aqueous dispersion medium | | | Deionized water | 500 | 500 | 500 | 500 | ROPAQ |
| | | | NaCl | 100 | 100 | 0 | 0 | UE |
| | | | Colloidal silica (20-wt % effective conc.) | 65 | 80 | 100 | 100 | HP1055 |
| | | | Adipic acid-diethanol amine condensate | 3 | 3 | 3 | 3 | |
| Oily mixture | Polymerizable | Monomers | AN | 180 | 113 | 0 | 171 | |

TABLE 1-continued

| | | | | | | |
|---|---|---|---|---|---|---|
| component | MAN | 20 | 38 | 170 | 9 | |
| | MA | 0 | 0 | 0 | 0 | |
| | MMA | 0 | 50 | 30 | 0 | |
| | IBX | 0 | 0 | 0 | 20 | |
| Cross-linking agent | EDMA | 4 | 2 | 2 | 2 | |
| Polymerization initiators | AIBN | 0 | 1.5 | 1.5 | 1.5 | |
| | OPP | 1.5 | 0 | 0 | 0 | |
| Thermally-vaporizable hydrocarbons | Isobutane (b.p.: −12° C.) | 20 | 30 | 30 | 30 | |
| | Isopentane (b.p.: −28° C.) | 40 | 30 | 30 | 30 | |
| | Isohexane (b.p.: 49-63° C.) | 0 | 0 | 0 | 0 | |
| | Isooctane (b.p.: 99° C.) | 0 | 0 | 0 | 0 | |
| | Isododecane (b.p.: 177° C.) | 0 | 0 | 0 | 0 | |
| Total of monomers | | 200 | 200 | 200 | 200 | — |
| Amount of nitrile monomer in the polymerizable component | | 100 | 75 | 85 | 90 | — |
| Hollow resin particles | | Hollow resin particles F | Hollow resin particles G | Hollow resin particles H | Hollow resin particles I | — |
| Properties of hollow particles | Mean volume particle size (μm) | 8 | 5.0 | 2.5 | 2.5 | 1.0 |
| | True specific gravity | 0.06 | 0.11 | 0.23 | unexpanded | 0.65 |
| | Hollow ratio (%) | 95 | 90 | 78 | unexpanded | 55 |
| | Encapsulation ratio (wt %) | 14.9 | 0 | 0 | — | 0 |
| | Compression recovery (%) | 92 | 38 | 15 | — | 50 |

The monomers, cross-linking agent and polymerization initiators in Table 1 are expressed by the following abbreviations.
AN: acrylonitrile
MAN: methacrylonitrile
MA: methyl acrylate
MMA: methyl methacrylate
IBX: isobornyl methacrylate
EDMA: ethylene glycol dimethacrylate
AIBN: 2,2'-azobisisobutylonitrile
OPP: di-2-ethylhexyl peroxydicarbonate Sensitivity and Precision of Thermosensitive Recording Media A thermosensitive recording medium was prepared with the materials and using the procedures described below.

Test 1

Preparation of Under Layer Liquid

Hollow resin particle composition A (containing the hollow resin particles A, 33-wt % solid content concentration): 20 parts by weight
  Styrene-butadiene copolymer latex (47.5-wt % solid content concentration): 20 parts by weight
  10-wt % polyvinyl alcohol aqueous solution (PVA117, manufactured by Kuraray Co., Ltd.): 20 parts by weight
  Deionized water: 40 parts by weight The components shown above were mixed and agitated to prepare an under layer liquid.

Preparation of Thermosensitive Recording Layer Liquid

Dye Dispersion

Leuco dye (3-dibutylamino-6-methyl-7-anilinofluoran): 20 parts by weight
  10-wt % aqueous solution of itaconic acid-modified polyvinyl alcohol (25-88KL, manufactured by Kuraray Co., Ltd.): 40 parts by weight
  Surfactant (Newcol 290, 100-wt % solid content concentration, manufactured by Nippon Nyukazai Co., Ltd.): 0.2 parts by weight
  Deionized water: 40 parts by weight The components shown above were dispersed by a sand grinder to a mean particle size of 0.5 m to prepare a dye dispersion.

Developer Dispersion 4-hydroxy-4'-isopropoxydiphenyl sulfone: 20 parts by weight
  10-wt % aqueous solution of itaconic acid-modified polyvinyl alcohol (25-88KL, manufactured by Kuraray Co., Ltd.): 20 parts by weight
  Amorphous silica (MIZUKASILL P527, manufactured by Mizusawa Industrial Chemicals, Ltd.): 15 parts by weight
  Surfactant (PD-001, 100-wt % solid content concentration, manufactured by Nissin Chemical Co., Ltd.): 0.2 parts by weight
  Deionized water: 60 parts by weight The components shown above were dispersed by a sand grinder to a mean volume particle size of 1.0 m to prepare a developer dispersion.

Then, the thermosensitive recording layer liquid was prepared by mixing and agitating 20 parts by weight of the dye dispersion, 40 parts by weight of the developer dispersion, 5 parts by weight of the styrene-butadiene copolymer latex (47.5-wt % solid content concentration), 10 parts by weight of the 10-wt % aqueous solution of itaconic acid-modified polyvinyl alcohol and 40 parts by weight of deionized water.

Filler A Dispersion

Aluminum hydroxide: 30 parts by weight
  10-wt % aqueous solution of itaconic acid-modified polyvinyl alcohol (25-88KL, manufactured by Kuraray Co., Ltd.): 30 parts by weight
  Deionized water: 40 parts by weight The components shown above were dispersed by a sand grinder the mean volume particle size of 0.5 m to prepare the filler A dispersion.

Preparation of Protective Layer Liquid

Filler A dispersion: 30 parts by weight
  10-wt % aqueous solution of diacetone-modified polyvinyl alcohol (DF-17, manufactured by Japan VAM & Poval Co., Ltd.): 50 parts by weight
  Cross-linking component (B) liquid (adipic acid dihydrazide, 10-wt % solid content concentration): 20 parts by weight Montanic acid ester wax dispersion (30-wt % solid content concentration): 5 parts by weight Deionized water: 15 parts by weight The components shown above were mixed and agitated to prepare a protective layer liquid.

The under layer liquid was applied on a sheet of paper having a surface density of 62 g/m² used as the substrate in a deposition amount of 1.5 g/m² after drying. Then the thermosensitive recording layer liquid was applied on the under layer in a deposition amount of 3.0 g/m² after drying, and the liquid was dried. Then the protective layer liquid was applied on the thermosensitive recording layer in a deposition amount of 2.0 g/m² after drying, and the liquid was dried. After that, the surface of the substrate having the thermosensitive recording layer was surface-treated by a super calendar to cause the surface to have an Oken smoothness of 2000 s to prepare the thermosensitive recording medium 1.

Tests 2 to 5 and 7 to 10

Thermosensitive recording media 2 to 5 and 7 to 10 were prepared in the same manner as described above, except that the hollow resin particle composition A used for the under layer in Test 1 was replaced by the hollow resin particle compositions B to I, respectively, containing the hollow resin particles B to I as shown in Table 2.

Test 6

Thermosensitive recording medium 6 was prepared in the same manner as Test 5, except that the calendaring parameters of the super calendar were adjusted to cause the surface to have an Oken smoothness of 1000 s. Thermosensitive recording media having a higher smoothness are manufactured with a higher applied pressure on their surface.

Test 11

Thermosensitive recording medium 11 was prepared in the same manner as Example 1, except that the hollow resin particle composition A used for the under layer in Test 1 was replaced by 25 parts by weight of the hollow particles having 50-% hollow ratio and 10-μm mean particle size (HP-1055, 26.5-wt % solid content concentration, manufactured by the Dow Chemical Company, hereinafter also referred to as HP-1000).

Test 12

Thermosensitive recording medium 12 was prepared in the same manner as Example 1, except that the hollow resin particle composition A used for the under layer in Test 1 was replaced by 20 parts by weight of the heat-expandable microspheres A (33-% solid content concentration) obtained in the polymerization in Example 1.

The sensitivity, precision and hydrocarbon content of the thermosensitive recording media prepared in Tests 1 to 12 were measured as described below. The results are shown Table 2.

Sensitivity

A sample of thermosensitive recording medium was printed by a printing simulator (manufactured by Okura Electric Co., Ltd.) with a pulse width from 0.2 ms to 1.2 ms under the following conditions: a head power of 0.45 w/dot, line recording time of 20 ms/line and scanning line density of 8×3.85 dots/mm. The print density was measured with a Macbeth Reflection Densitometer (RD-914, manufactured by Gretag Macbeth Ltd.). The pulse width required to achieve a print density of 1.0 was calculated, and the sensitivity magnification of the thermosensitive recording medium relative to Test 8 was calculated from the energy of the pulse width by the following formula. The result was evaluated according to the following criteria.

Sensitivity Magnification=(Pulse Width for Test 8)/(Pulse Width for the Sample)

Evaluation Criteria
A: sensitivity magnification of 1.11 or more
B: sensitivity magnification from 1.01 to 1.10
C: sensitivity magnification of 1.00 or less Precision Some characters and images were printed on each thermosensitive recording medium (with no printed parts) by a thermal label printer (I-4308, manufactured by DATAMAX) at a printing speed of 8 ips to obtain a printing density of 0.80. The printed characters and images were visually inspected and evaluated according to the following criteria.

Evaluation Criteria
A: No voids in the printed characters and images
B: Slight voids in the printed characters and images that do not prevent their recognition
C: Voids in the printed characters and images that prevent their recognition Comprehensive Evaluation of Thermosensitive Recording Media The lower result of the sensitivity and precision evaluations of each of the thermosensitive recording media of the Tests was defined as the comprehensive evaluation of the medium.

Amount of Hydrocarbon Contained in Thermosensitive Recording Media

The amount of hydrocarbon contained in each thermosensitive recording medium was measured by headspace gas chromatography as described below.

In a 20-mL headspace vial, 0.02 g of a thermosensitive recording medium containing hollow resin particles was weighed (an adhesive layer contained in the medium was removed before weighing), and the headspace vial was tightly stoppered with a fluoro-resin-coated silicone rubber septum and an aluminum cap. The stoppered headspace vial was heated at 170° C. for 20 minutes and pressurized by helium for 0.5 minutes. Then 3 mL of the gas phase (headspace) was collected and introduced into a gas chromatograph to obtain the data for determining the amount of the hydrocarbon contained in the thermosensitive recording medium.

The conditions of the headspace gas chromatography were as follows.

Conditions
GC column: DB-624, 30 m long, 0.25 mm in inner diameter, 1.40-μm wall thickness, manufactured by Agilent Technologies
Detector: FID, 200° C.
Temperature elevation program: The column was held at 40° C. for 6 minutes, then heated to 200° C. by elevating the temperature at a rate of 20° C./min, and held at 200° C. for 3 minutes.
Inlet temperature: 200° C.
Amount of gas introduced: 3 mL
Helium flow rate: 1 mL/min
Split ratio: 10:1

The quantitative determination was performed by a calibration curve method including the following procedure.

Conditions for Quantification Procedure

A known amount of a sample was dissolved in DMF, and 5 μL of the solution was measured in a 20-mL headspace vial. The headspace vial was tightly stoppered with a fluoro-resin-coated silicone rubber septum and an aluminum cap. The stoppered headspace vial was heated at 170° C. for 20 minutes and pressurized by helium for 0.5 minutes. Then 3 mL of the gas phase (headspace) was collected and introduced into a gas chromatograph.

Amount of Hydrocarbon Per Unit Area of Thermosensitive Recording Media

The surface density (g/m²) of each thermosensitive recording medium containing hollow resin particles was determined by weighing 0.02 g of the thermosensitive recording medium and measuring its area.

Then the amount of hydrocarbon contained in 1 m² of the thermosensitive recording medium containing hollow resin particles was calculated by the formula described below from the amount of hydrocarbon contained in the thermosensitive recording medium and the surface density of the thermosensitive recording medium measured as described above.

Amount of hydrocarbon contained in 0.02 g of the thermosensitive recording medium containing hollow resin particles=M (mg)

Area of 0.02 g of the thermosensitive recording medium containing hollow resin particles=S (m²)

The amount of hydrocarbon contained in 1 m² of the thermosensitive recording medium, C (g/m²), is thus calculated by the following formula:

$$C = M/S \text{ (g/m}^2\text{)}$$

changed after super-calendar processing (the hollow resin particles were crushed by super-calendar processing).

The hollow resin particles for thermosensitive recording media of the present invention can be used to manufacture recording media that are printable by thermal printers, and are especially suitable for manufacturing thermosensitive recording media containing leuco dyes. The particles can also be used to manufacture thermal-transfer or thermal-diffusion recording media.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. Hollow resin particles for thermosensitive recording media, the particles comprising a thermoplastic resin shell and a hollow part surrounded by the shell,
    wherein the hollow resin particles contain a thermally-vaporizable hydrocarbon in an encapsulation ratio of at least 0.2 wt %,

TABLE 2

| | Hollow resin particles | Oken smoothness | Thermally-vaporizable hydrocarbon content | Evaluation | | | |
|---|---|---|---|---|---|---|---|
| | | | | Sensitivity magnification | Sensitivity | Precision | Comprehensive evaluation |
| Test 1 | Hollow resin particles A | 2000s | 0.24 mg/m² | 1.06 | B | A | B |
| Test 2 | Hollow resin particles B | 2000s | 0.85 mg/m² | 1.10 | B | A | B |
| Test 3 | Hollow resin particles C | 2000s | 4.2 mg/m² | 1.15 | A | A | A |
| Test 4 | Hollow resin particles D | 2000s | 3.5 mg/m² | 1.14 | A | A | A |
| Test 5 | Hollow resin particles E | 2000s | 8.4 mg/m² | 1.19 | A | A | A |
| Test 6 | Hollow resin particles E | 1000s | 8.4 mg/m² | 1.20 | A | B | B |
| Test 7 | Hollow resin particles F | 2000s | 14.9 mg/m² | 1.12 | A | B | B |
| Test 8 | Hollow resin particles G | 2000s | 0.09 mg/m² | 1.00 | C | B | C |
| Test 9 | Hollow resin particles H | 2000s | 0.08 mg/m² | 0.94 | C | B | C |
| Test 10 | Hollow resin particles I | 2000s | 0.07 mg/m² | 0.90 | C | C | C |
| Test 11 | HP-1000 | 2000s | 0.07 mg/m² | 0.95 | C | C | C |
| Test 12 | Heat-expandable microspheres A | 2000s | 15.0 mg/m² | 0.90 | C | C | C |

Figure 4:
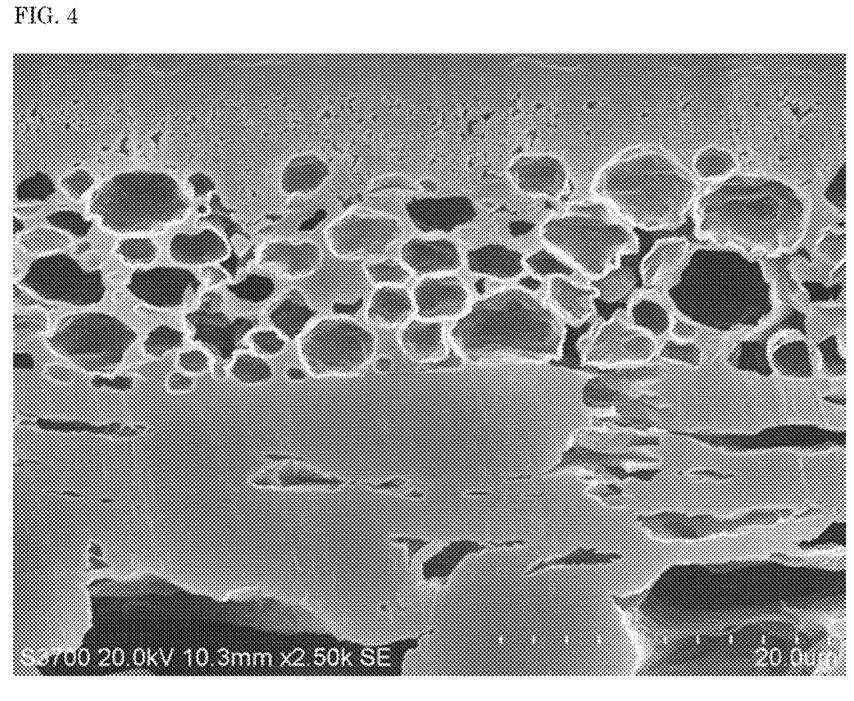
FIG. 4 is an electron photomicrograph of a cross section of the thermosensitive recording medium of Test 1 before super-calendar processing.
Figure 5:
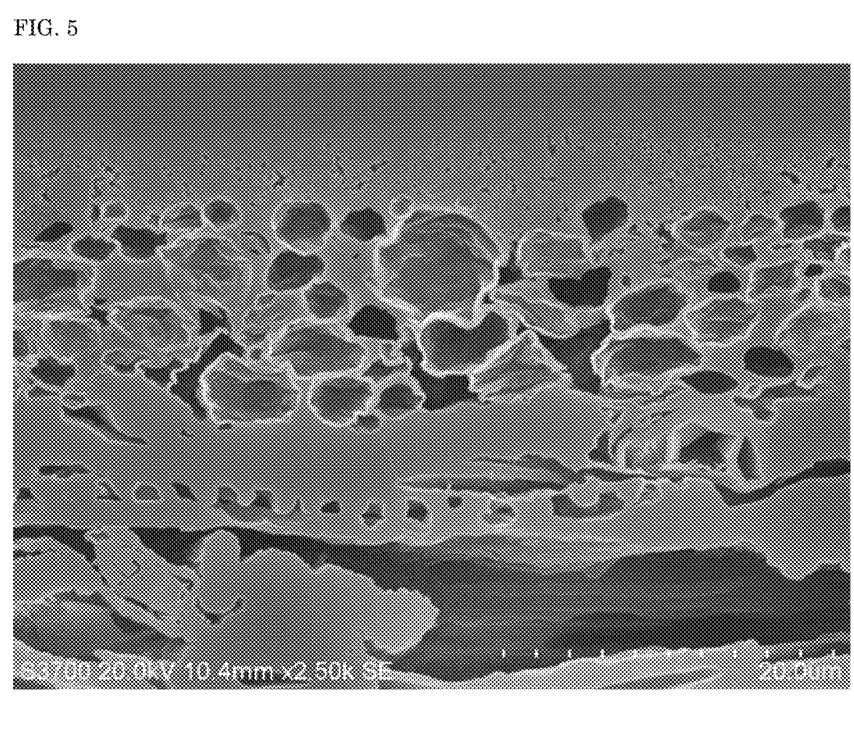
FIG. 5 is an electron photomicrograph of a cross section of the thermosensitive recording medium of Test 1 after super-calendar processing.
Figure 6:
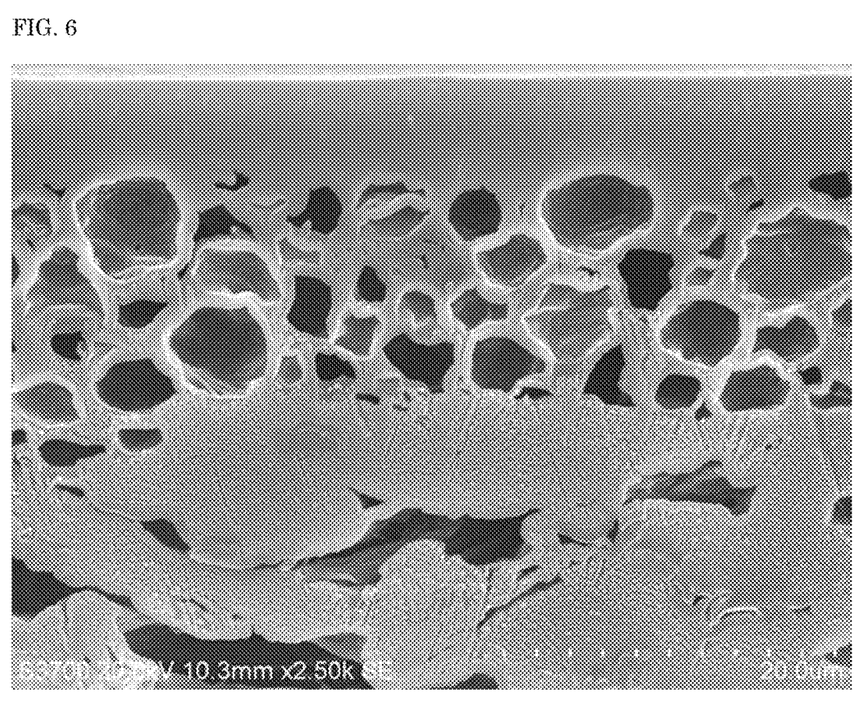
FIG. 6 is an electron photomicrograph of a cross section of the thermosensitive recording medium of Test 8 before super-calendar processing.
Figure 7:
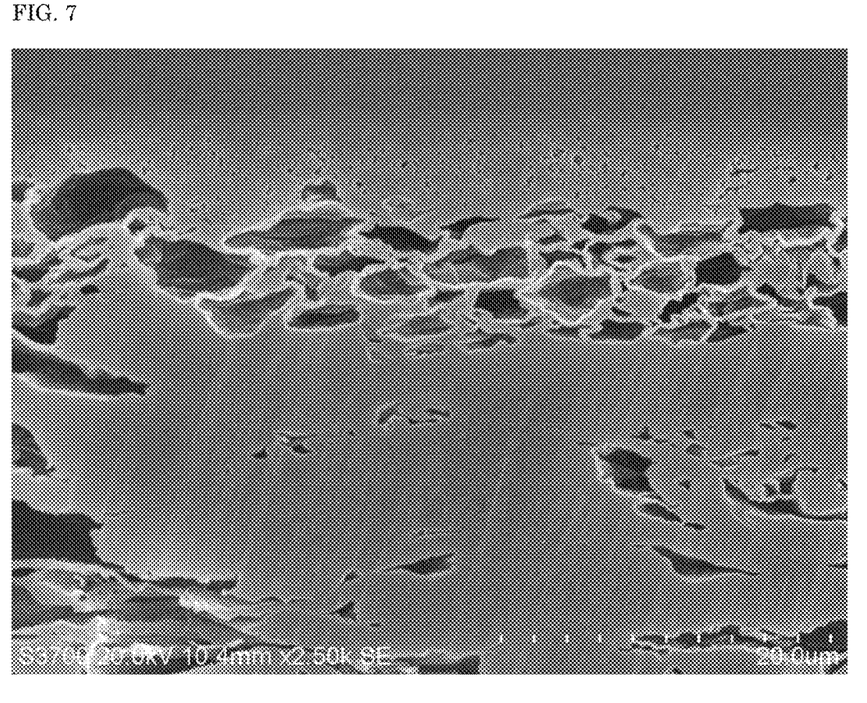
FIG. 7 is an electron photomicrograph of a cross section of the thermosensitive recording medium of Test 8 after super-calendar processing.

The electron photomicrographs of the cross section of the thermosensitive recording medium of Test 1 before and after super-calendar processing are respectively shown in FIGS. 4 and 5; and the electron photomicrographs of the cross section of the thermosensitive recording medium of Test 8 before and after super-calendar processing are respectively shown in FIGS. 6 and 7. As shown in FIGS. 4 and 5, almost no change was found in the shape of the hollow particles in the thermosensitive recording medium of Test 1 after super-calendar processing (the hollow resin particles were not crushed by super-calendar processing). On the other hand, as shown in FIGS. 6 and 7, the shape of the hollow resin particles in the thermosensitive recording medium of Test 8, which was produced using hollow resin particles containing no hydrocarbon in its under layer, was found to have a mean volume particle size of the hollow resin particles ranges from 0.1 to 10 μm,
a hollow ratio of the hollow resin particles ranges from 71 to 95%, and
a compression recovery rate of the hollow resin particles is at least 70%.

2. Hollow resin particles for thermosensitive recording media as claimed in claim 1, wherein the thermoplastic resin is a polymer of a polymerizable component containing at least 80 wt % of a nitrile monomer.

3. Hollow resin particles for thermosensitive recording media as claimed in claim 1, wherein the thermally-vaporizable hydrocarbon contains a hydrocarbon (A) having a boiling point of 60° C. or lower.

4. Hollow resin particles for thermosensitive recording media as claimed in claim 1, wherein the compression recovery rate of the hollow resin particles is at least 75%.

5. Hollow resin particles for thermosensitive recording media as claimed in claim 1, wherein the hollow resin particles contain a thermally-vaporizable hydrocarbon in an encapsulation ratio ranging from 1.0 to 20 wt %.

6. Hollow resin particles for thermosensitive recording media as claimed in claim 1, wherein the hollow resin particles contain a thermally-vaporizable hydrocarbon in an encapsulation ratio ranging from 3.5 to 20 wt %.

7. Hollow resin particles for thermosensitive recording media as claimed in claim 2, wherein the nitrile monomer contains acrylonitrile and methacrylonitrile, and wherein a weight ratio of acrylonitrile to methacrylonitorile in the nitrile monomer ranges from 10:90 to 90:10.

8. Hollow resin particles for thermosensitive recording media as claimed in claim 7, wherein the weight ratio of acrylonitrile to methacrylonitorile ranges from 10:90 to 75:25.

9. Hollow resin particles for thermosensitive recording media as claimed in claim 1, wherein the thermoplastic resin is a polymer of a polymerizable component which contains a cross-linkable agent having at least two radically reactive carbon-carbon bonds per molecule, and an amount of the cross-linkable agent in the polymerizable component ranges from 0.5 to 2.91 wt %.

\* \* \* \* \*